(12) United States Patent
Jhon et al.

(10) Patent No.: US 10,170,884 B2
(45) Date of Patent: Jan. 1, 2019

(54) SINGLE PULSE LASER APPARATUS

(71) Applicant: KOREA INSTITUTE OF SCIENCE AND TECHNOLOGY, Seoul (KR)

(72) Inventors: Young Min Jhon, Seoul (KR); Byunghyuck Moon, Seoul (KR); Young In John, Seoul (KR); Minah Seo, Seoul (KR); Jaehun Kim, Seoul (KR); Yongsang Ryu, Seoul (KR); Taikjin Lee, Seoul (KR); Seok Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/957,787

(22) Filed: Apr. 19, 2018

(65) Prior Publication Data

US 2018/0309260 A1   Oct. 25, 2018

(30) Foreign Application Priority Data

Apr. 24, 2017 (KR) .......................... 10-2017-0052311

(51) Int. Cl.
*H01S 3/098* (2006.01)
*H01S 3/11* (2006.01)
*H01S 3/08* (2006.01)
*H01S 3/10* (2006.01)
*H01S 3/115* (2006.01)
(Continued)

(52) U.S. Cl.
CPC ........ *H01S 3/1112* (2013.01); *H01S 3/08036* (2013.01); *H01S 3/08054* (2013.01); *H01S 3/10061* (2013.01); *H01S 3/11* (2013.01); *H01S 3/115* (2013.01); *H01S 3/092* (2013.01); *H01S 3/0941* (2013.01); *H01S 3/1611* (2013.01); *H01S 3/1623* (2013.01);
(Continued)

(58) Field of Classification Search
CPC .... H01S 3/11; H01S 3/08036; H01S 3/10061; H01S 3/115; H01S 3/1112; H01S 3/08054; H01S 3/092; H01S 3/0941; H01S 3/1611; H01S 3/1636; H01S 3/1643; H01S 3/1623; H01S 3/1625
See application file for complete search history.

(56) References Cited

U.S. PATENT DOCUMENTS

| 5,592,327 A | * | 1/1997 | Gabl | ....................... H01S 3/235 359/348 |
| 7,929,579 B2 | * | 4/2011 | Hohm | .................. A61B 18/203 372/12 |

(Continued)

FOREIGN PATENT DOCUMENTS

KR    10-1682593 B1    12/2016

*Primary Examiner* — Kinam Park
(74) *Attorney, Agent, or Firm* — Rabin & Berdo, P.C.

(57) ABSTRACT

Disclosed herein is a single pulse laser apparatus which includes a first mirror and a second mirror disposed at both ends of the single pulse laser apparatus and having reflectivities of a predetermined level or more; a gain medium rotated at a predetermined angle and configured to oscillate a laser beam in a manual mode-locking state; a linear polarizer configured to output a beam having a specific polarized component of the oscillated laser beam; an etalon configured to adjust a pulse width of the oscillated laser beam; and an electro-optic modulator configured to perform Q-switching and single pulse switching.

8 Claims, 7 Drawing Sheets

(51) Int. Cl.
    *H01S 3/092* (2006.01)
    *H01S 3/0941* (2006.01)
    *H01S 3/16* (2006.01)

(52) U.S. Cl.
    CPC .......... *H01S 3/1625* (2013.01); *H01S 3/1636* (2013.01); *H01S 3/1643* (2013.01)

(56) References Cited

U.S. PATENT DOCUMENTS

| | | | |
|---|---|---|---|
| 9,124,067 B2 * | 9/2015 | Jhon | H01S 3/117 |
| 2002/0167974 A1 * | 11/2002 | Kennedy | H01S 3/2232 372/10 |
| 2014/0056321 A1 * | 2/2014 | Peng | H01S 3/0941 372/27 |

* cited by examiner

SINGLE PULSE LASER APPARATUS

CROSS-REFERENCE TO RELATED APPLICATION

This application claims priority to and the benefit of Korean Patent Application No. 2017-0052311, filed on Apr. 24, 2017, the disclosure of which is incorporated herein by reference in its entirety.

BACKGROUND

1. Field of the Invention

The present invention relates to a laser apparatus, and more specifically, to a single pulse laser apparatus using nonlinear polarization rotation of a gain material.

2. Discussion of Related Art

Recently, laser treatment technologies are widely being used, and laser treatment apparatuses are being used for dermatology, ophthalmology, dentistry, surgical operations, and the like. Among these, laser treatment apparatuses used in dermatology are generally used for treating a lesion, such as a skin disease that develops on skin or a vessel disease, and a treatment purpose is achieved by emitting laser beams having a certain wavelength and intensity. Various kinds of lasers are used for treatment in dermatology. An alexandrite laser (operating at a wavelength of 755 nm and developed in 2012) is mainly used for pathological skin pigmentation naturally occurring on skin and from tattoos, and uses a picosecond pulse for maximizing therapeutic effects while minimizing aftereffects. In addition, a long pulse ruby laser is used for removing hair, and an Nd:YAG laser (operating at a wavelength of 1060 nm), a carbon-dioxide laser ($CO_2$ laser operating at a wavelength of 10.6 μm), and an argon laser (operating at a wavelength in a range of 488 to 514 nm) are used for treating expandable blood vessels.

Specifically, a laser treatment apparatus is used for treating various pathological skin problems, such as a pigment disorder including spot discoloration, other expandable vessel disorders and tattoos. The laser treatment apparatus may allow for localized heating to raise a temperature to an extent at which contained proteins are denatured or pigment molecules are dispersed. Here, unlike a research or industrial laser, it is important for a medical laser to have a laser beam having a pulse width and energy suitable for treating a skin disorder. Particularly, energy may be focused on output pulses to maximize a therapeutic effect, and to this end, a laser capable of outputting a single pulse is necessary.

In the related art, a pulse picker method and a cavity dumping method are used for outputting a single picosecond pulse with high energy. However, when such methods are used, there are problems in that burdens of circuit designing, manufacturing costs, and power consumption occur due to needs for a high speed and high voltage circuit, an amplifier has to be used due to low output energy, and burdens of an increased system volume due to usage of the amplifier, power consumption, and cost due to a high voltage supplied to the amplifier occur.

In U.S. Pat. No. 7,929,579, a method by which a high energy single pulse is output using one electro-optic modulator (EOM) and a cavity dumping method is disclosed. However, in this case, there are problems in that burdens of cost and power consumption occur because a high voltage EOM is used and a high speed and high voltage driving circuit is necessary, and a burden of power consumption occurs due to a high voltage because all of a mode-locking, a Q-switching, and a single pulse output are performed using only one EOM. In addition, the high speed and high voltage switching circuit has to be manufactured to perform all of the mode-locking, the Q-switching, and the single pulse output using the high voltage EOM. In addition, even though usage of the amplifier is not necessary due to being able to output a high energy picosecond single pulse, there is a limitation in generating a short pulse width due to not implementing complete mode-locking.

PRIOR ART (Patent Document 1) U.S. Pat. No. 7,929,579

SUMMARY OF THE INVENTION

The present invention is directed to providing a single pulse laser apparatus configured to perform mode-locking using a gain difference based on a polarization axis of a gain medium.

According to an aspect of the present invention, there is provided a single pulse laser apparatus including: a first mirror and a second mirror disposed at both ends of the single pulse laser apparatus and having reflectivities of a predetermined level or more; a gain medium rotated at a predetermined angle and configured to oscillate a laser beam in a manual mode-locking state; a linear polarizer configured to output a beam having a specific polarized component of the oscillated laser beam; an etalon configured to adjust a pulse width of the oscillated laser beam; and an electro-optic modulator configured to perform Q-switching and single pulse switching.

The gain medium may be rotated at the predetermined angle to oscillate a diagonally polarized beam.

The linear polarizer may output a beam having a vertically polarized component of the diagonally polarized beam, and a beam having a horizontally polarized component may pass through the linear polarizer.

Refractive indexes of the beams having the vertically polarized component and the horizontally polarized component may change according to intensities of the beams, and a diagonally polarized component of the diagonally polarized beam may be rotated into horizontal polarization due to a phase difference according to a difference in reflectivity.

A high gain axis of the gain medium may be rotated at 30° with respect to the ground surface.

The etalon may have parallel flat panels having a predetermined reflectivity, and be an optical element in which a multilayer dielectric thin film is deposited on the parallel flat panels formed of glass or crystal, or multilayer dielectric thin films are deposited on both surfaces thereof to increase reflectivity, wherein a pulse width of a laser beam may be adjusted due to the reflectivity, a thickness, and a refractive index of the etalon in that a transmission wavelength band may be limited when the laser beam passes through the etalon.

The etalon may include at least one etalon, and the etalons having different properties may be selectively used inside or outside a cavity to adjust the pulse width of the laser beam.

A pulse width of the laser beam may be adjusted to be within a range of 100 ps to 1 ns.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. However, the embodiments are provided to be fully understood to those skilled in the art, and may be modified into various different forms, and the scope of the present invention is not limited to the embodiments which will be described below.

In addition, major factors of a laser for treating skin are pulse energy, a pulse width, a picosecond, a laser wavelength, Q-switching, mode-locking, a single pulse, cavity dumping, and the like.

Figure 1:
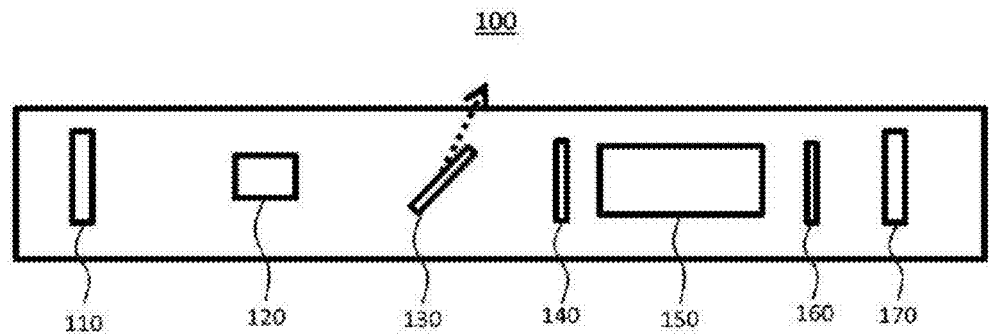
FIG. 1 is a block diagram illustrating a cavity of a single pulse laser apparatus according to the exemplary embodiment of the present invention.

FIG. 1 is a block diagram illustrating a cavity of a single pulse laser apparatus according to the exemplary embodiment of the present invention.

Referring to FIG. 1, a single pulse laser apparatus according a first embodiment includes a cavity 100, and the cavity 100 includes a first mirror 110, an electro-optic modulator (EOM) 120 configured to perform Q-switching and single pulse switching, a linear polarizer 130, an iris 140, a gain medium 150 configured to perform mode-locking, an etalon 160, and a second mirror 170.

The first mirror 110 and the second mirror 170 are disposed at both ends of the cavity 100. Both of the first mirror 110 and the second mirror 170 are total reflection mirrors having a reflectivity of 99.9% or higher to perform a cavity dumping method.

The linear polarizer 130 outputs a laser beam oscillated in the cavity 100.

The gain medium 150 is a material in which a population inversion can occur through pumping, and an external beam incident on the material is amplified and output as a beam having high intensity. An external device used as a pumping device includes a flash lamp, an arc lamp, other lasers, or the like. The gain medium 150 may use a sapphire crystal rod doped with alexandrite or titanium, an yttrium aluminum garnet crystal (Nd:YAG crystal) rod doped with neodymium, or the like.

For example, when a beam is incident on the gain medium 150 using a pump lamp, the beam excited in the gain medium 150 passes through the etalon 160 along a beam axis and is reflected by the second mirror 170. Then, the beam, which sequentially passes through the etalon 160, the gain medium 150, and the EOM 120, is reflected by the first mirror 110.

Preferably, after the gain medium 150 rotates to induce a mode-locking state and prevent oscillation in order to maximize cavity loss, Q-switching and single pulse switching may be performed by instantaneously outputting stored sufficient energy through the EOM 120. A configuration for performing mode-locking using rotation of the gain medium 150 will be described below in detail.

The etalon 160 serves to adjust a pulse width of the laser beam, has parallel flat panels having a predetermined reflectivity, and is a general optical element in which a multilayer dielectric thin film is deposited on the parallel flat panels, or multilayer dielectric thin films are deposited on both surfaces thereof formed of glass or crystal to increase reflectivity.

The EOM 120 configured to perform Q-switching and single pulse switching Q-switches a pulse, switches the Q-switched pulse to perpendicularly rotate a polarized beam, and causes the linear polarizer 130 to reflect the polarized beam to output a single pulse.

Hereinafter, a process in which mode-locking and Q-switching are performed and a single pulse is output in the cavity 100 will be described with reference to FIGS. 2 to 4.

First, the gain medium 150 included in the cavity 100 according to the present invention is rotated at a predetermined angle (for example, 30°) and mode-locking is continuously performed by the gain medium 150 rotated at the predetermined angle. Thus, in a diagonally polarized state, the mode-locking is performed using a gain difference according to a polarization axis of the gain medium. Conventionally, although oscillation is performed in a singly polarized state using a gain medium in a parallel or vertical direction, in the present invention, the gain medium is rotated at the predetermined angle to perform oscillation in a manual mode-locking state.

Here, when the oscillation is said to be performed in the manual mode-locking state, it indicates not that mode-locking is performed using external energy, but that a mode-locking state is generated by the cavity 100 itself, for example, a mode-locking is performed by the cavity 100 itself using a saturable absorber, a Kerr lens, or nonlinear polarization rotation (NPR).

Figure 2:
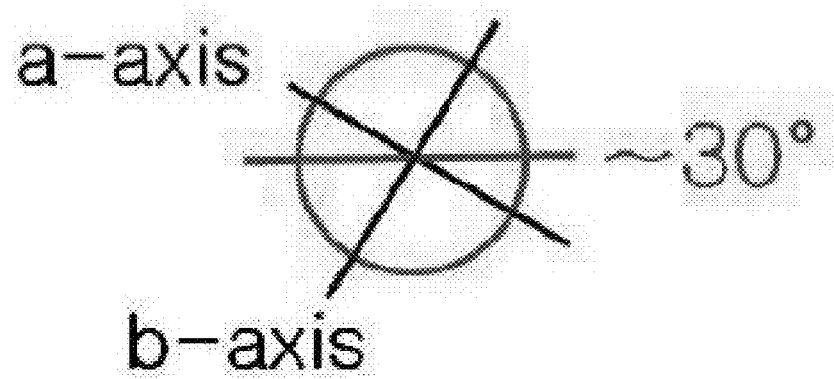
FIG. 2 is a cross-sectional view illustrating a gain medium.
Figure 3:
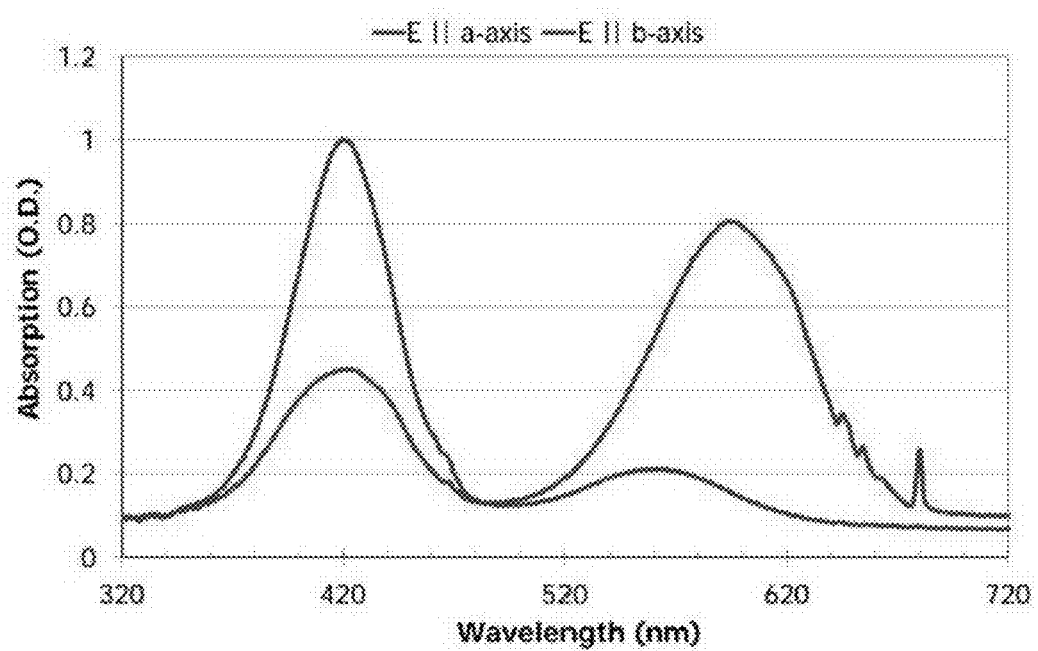
FIG. 3 is a graph of an absorption ratio of the gain medium.

In addition, a fact in which a gain of a beam initially oscillated in a diagonally polarized state along the gain medium 150 rotated at the predetermined angle is changed according to an intensity of the beam denotes that when an a-axis of the gain medium 150 is rotated at 30° with respect to the ground surface, since a difference in absorption ratio at a wavelength of 420 nm is two times or greater as shown in a graph of FIG. 3 showing absorption ratios, a difference in gain may be two times or greater, wherein a cross section of the gain medium 150 is illustrated in FIG. 2, the a-axis is a high gain axis, and a b-axis is a low gain axis perpendicular to the a-axis. That is, since the gain medium 150 absorbs photons having the wavelength of 420 nm and emits photons having a wavelength of 750 nm, as an absorption ratio increases, a gain increases.

Next, when a beam, which is diagonally polarized (at about 30°) due to a difference in gains of the a-axis and the b-axis of the gain medium 150 and an amount of photons generated at the a-axis is greater than that of photons generated at the b-axis, is oscillated, the beam containing a vertically polarized component of the beam oscillated in a diagonally polarized state is output to the outside by the linear polarizer 130, and the beam containing a horizontally polarized component of the beam passes through the linear polarizer 130. Accordingly, while the beam reciprocates in the cavity 100, a diagonally polarized component thereof is rotated into a horizontally polarized beam, the rotated component is continuously amplified, and a component, which is not rotated, disappears due to attenuation. That is, the NPR method may be performed according to the present invention.

Figure 4:
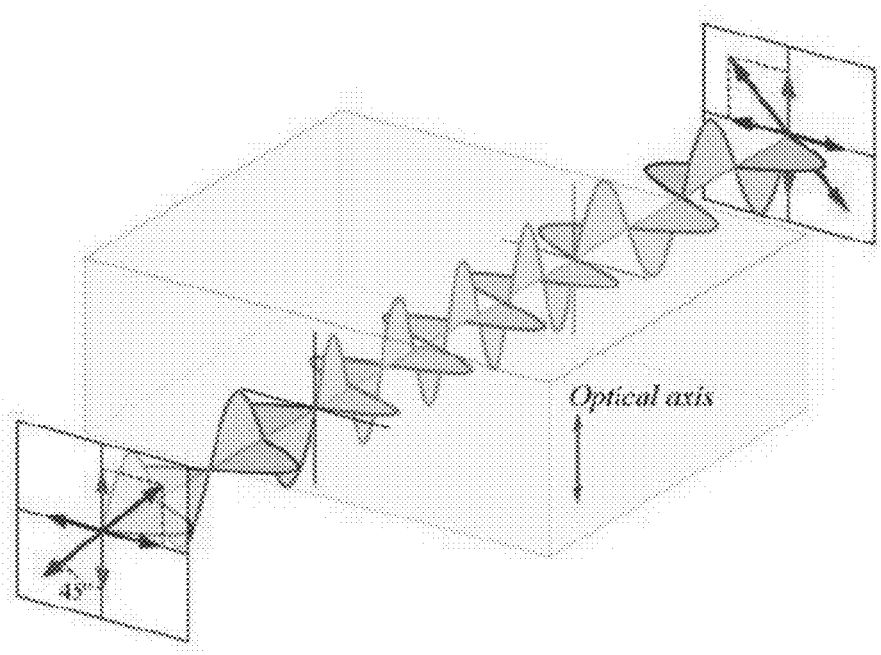
FIG. 4 is a view for describing a nonlinear polarization rotation (NPR) phenomenon.

Here, referring to FIG. 4, the NPR denotes that, a phenomenon in which polarization is rotated when a vertically or horizontally polarized beam passes through a material having a large nonlinear coefficient, is also referred to as a nonlinear phenomenon. More specifically, the NPR method satisfies the following Equation, and referring to the following Equation, when an electric field E increases, $n_2$ which is a second component of a refractive index n affects a refractive index.

$$n(I) = n_0 + \frac{3X^{(3)}}{8n_0}|E_w|^2 = n_0 + n_2 I \quad \text{[Equation]}$$

That is, in the present invention, when the beam which is diagonally polarized at about 30° through the gain medium 150 passes through a material having a large $n_2$ value, since refractive indexes of a vertical component and a horizontal component of the corresponding beam are different according to an intensity of the beam, the polarization is rotated due to different phase differences. Here, since a refractive index is higher at an axis at which the intensity of the beam is higher, the components have different phase differences, and the polarization is rotated from 30° to 0° at which a refractive index is higher.

Next, a pulse width of the mode-locked pulse through the gain medium 150 rotated a predetermined angle is adjusted to be a value in the range of 100 ps to 1 ns by the etalon 160, and since the first and second mirrors 110 and 170 are total reflective mirrors having a reflectivity of 99.9% or higher, the beam may not escape from the cavity 100 to the outside, and thus all pumping energy is stored in the cavity 100.

Cavity loss occurs through the linear polarizer 130, and the cavity loss is maximized by a voltage of the EOM 120 being zero. In a state in which the cavity loss is maximized, the energy is sufficiently stored, the voltage of the EOM 120 is instantaneously raised to a quarter wave voltage to output the stored sufficient energy, and thus a mode-locked and Q-switched single pulse is output.

Figure 5A:
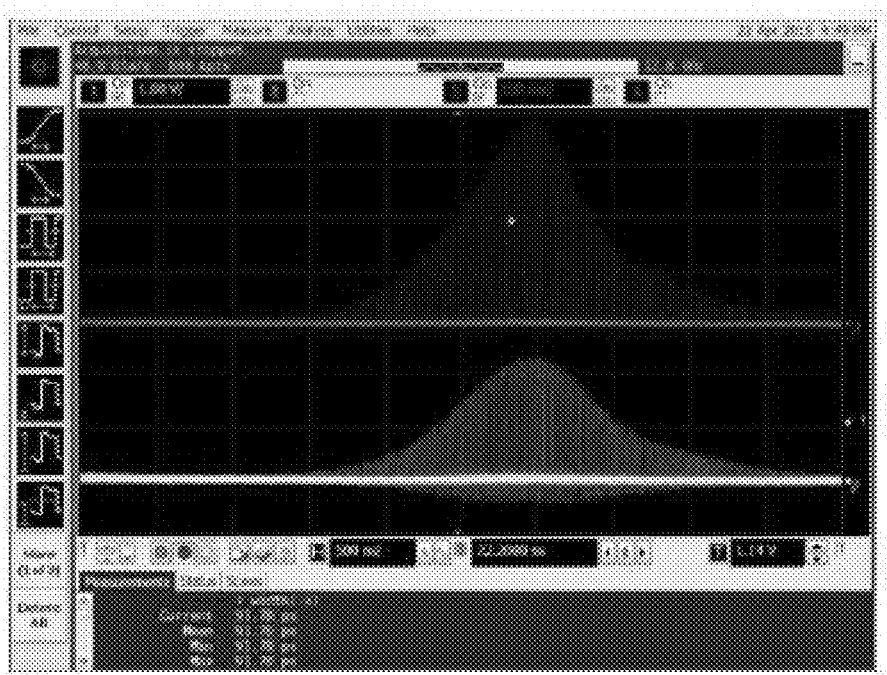
FIGS. 5A, 5B, 6, and 7 are views showing results of experiments performed using the cavity according to the embodiment of the present invention.
Figure 5B:
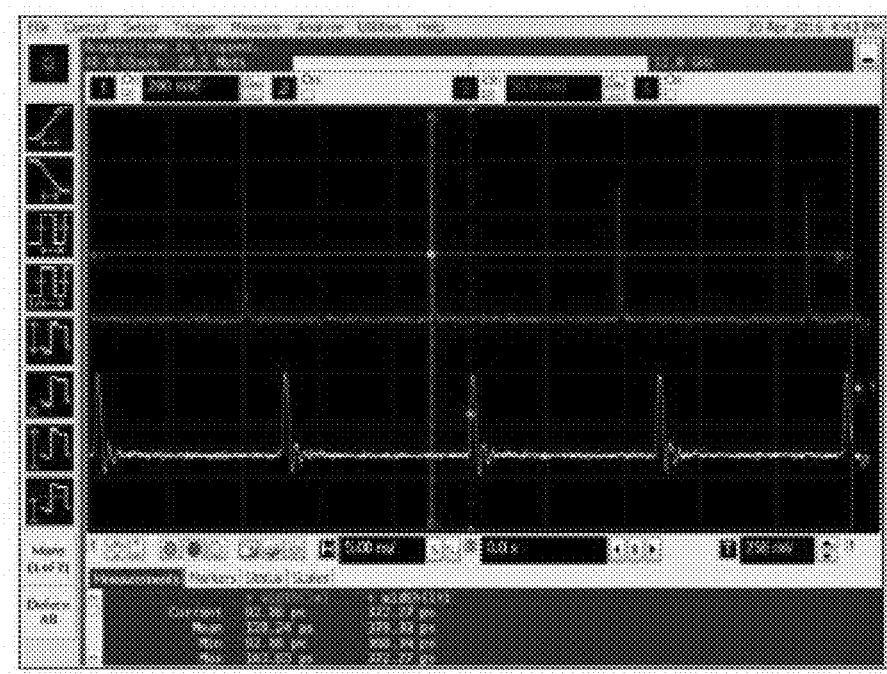

FIGS. 5A and 5B are views showing results of experiments performed using the cavity according to the embodiment of the present invention.

Referring to FIGS. 5A and 5B, a blue line in the graph corresponds to a case in which a bandwidth of a detector was 10 GHz, and a yellow line in the graph corresponds to a case in which a bandwidth of a detector was 2 GHz. Although, there is a difference between the lines according to the bandwidths of the detectors, a mode-locking state may be generated in the cavity of the present invention in each case of FIGS. 5A and 5B.

Figure 6:
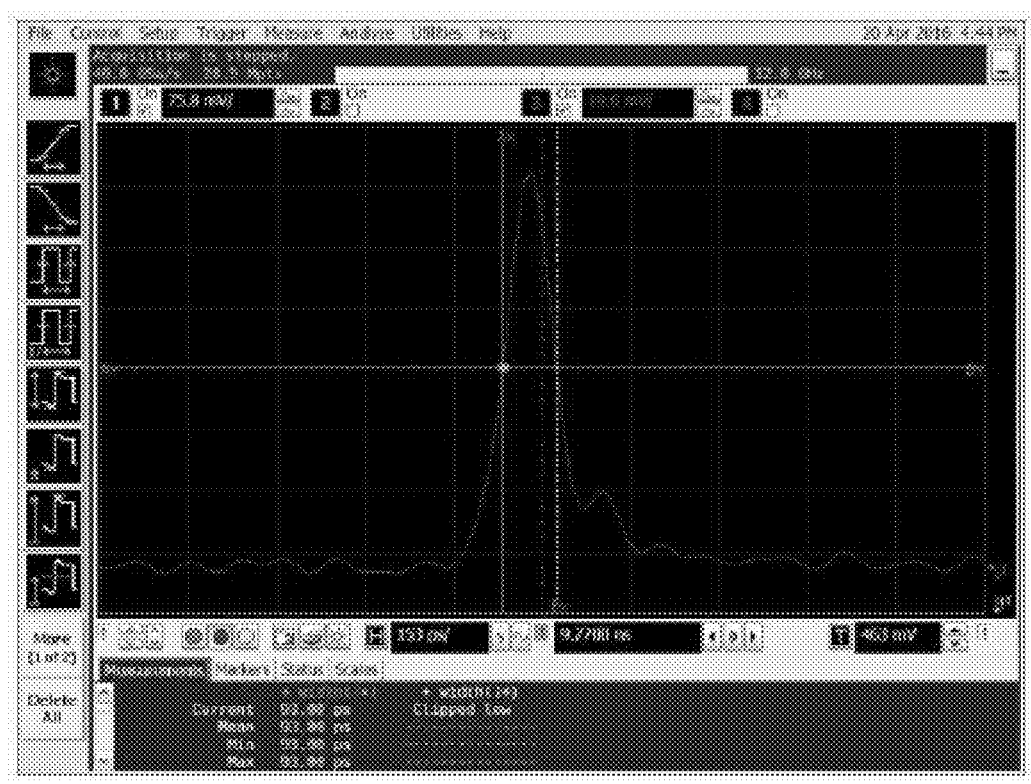
Figure 7:
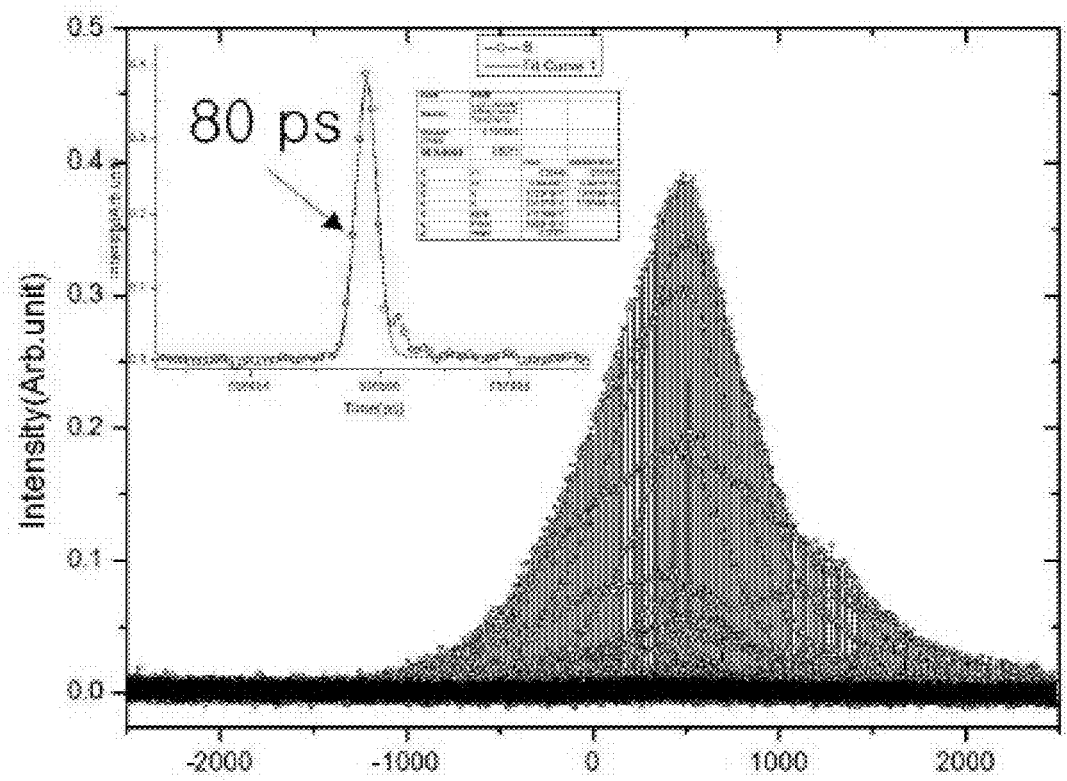

FIGS. 6 and 7 are views showing results of experiments performed using the cavity according to the embodiment of the present invention.

Referring to FIG. 6, a pulse width of 93 ps was detected using the cavity 100 configured to perform mode-locking using rotation of the gain medium 150 according to the present invention. However, since the pulse width of 93 ps was a value detected due to a limitation of the detector and an oscilloscope, a shorter pulse width may actually be detected.

In addition, referring to FIG. 7, a Q-switching and mode-locking state having a pulse width of 80 ps and a repetition rate of 80 MHz may be identified.

Figure 8:
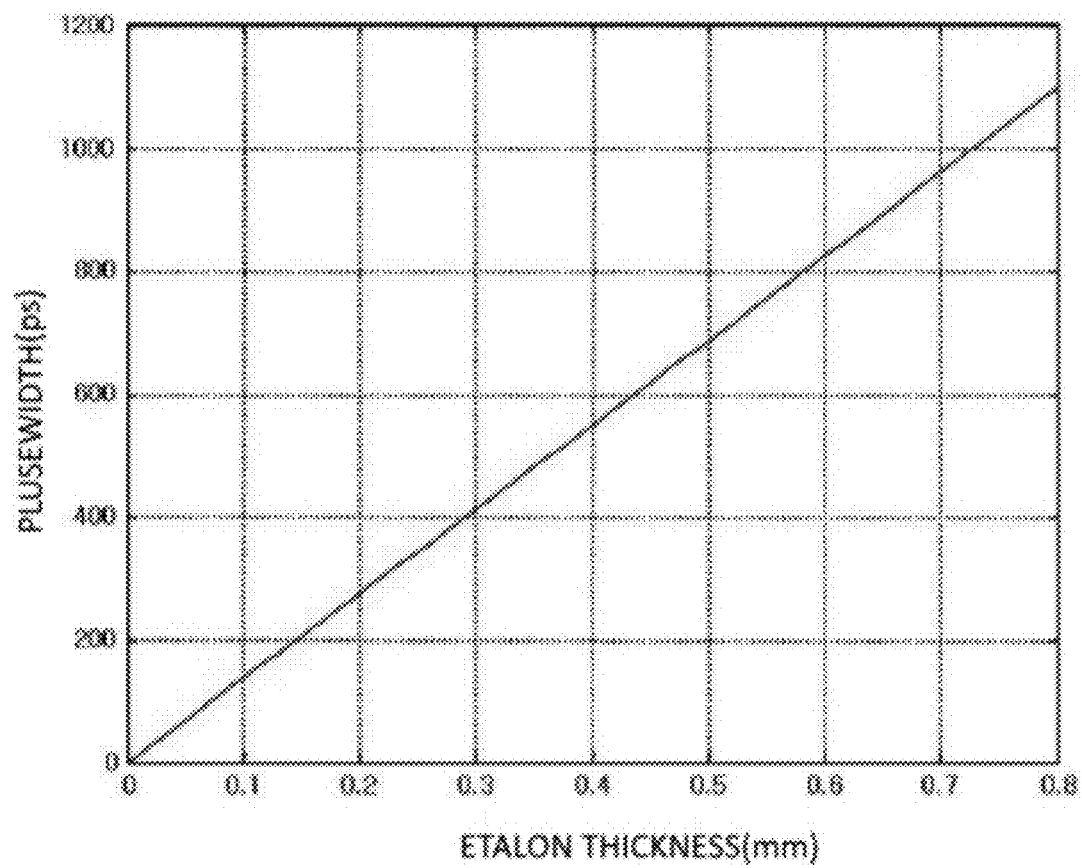
FIG. 8 is a graph of a pulse width varying according to a thickness of an etalon.

FIG. 8 is a graph of a pulse width varying according to a thickness of an etalon.

Referring to FIG. 8, a pulse width of a Q-switched and mode-locked pulse output after being mode-locked may be adjusted to a pulse width of 1 ns or greater using the etalon 160, and the etalon 160 having one of various thicknesses may be used to adjust a pulse width.

More specifically, when a laser beam passes through the etalon 160, a transmission wavelength band of the laser beam is limited according to reflectivity, a thickness, and a refractive index of the etalon 160, and accordingly, a pulse width is adjusted.

Here, a degree of freedom of adjusting a pulse width of a laser beam may be increased by adjusting the number of etalons 160. For example, it is preferred that the laser pulse width be freely adjusted to be in a range of 100 ps to 1 ns for a medical laser.

In a case in which the etalon 160 (an extra-cavity) is disposed outside the cavity 100, since a laser beam passes through the etalon 160 once when the laser beam is output, reflectivity of the etalon 160 has to be very high to obtain an effect of generating a desired pulse width. Conversely, in a case in which an etalon 160 (an intra-cavity) is disposed in the cavity 100, even when the parallel plate type etalon 160 does not have dielectric thin film on both surfaces thereof and a reflectivity of the etalon 160 is as small as about 4%, since a laser beam sufficiently reciprocates in the cavity 100, an effect thereof is the same as that of a high reflectivity etalon installed outside the cavity 100.

Accordingly, there is an advantage in that a suitable pulse width can be selected for treatment.

As described above, according to a single pulse laser apparatus of the present invention, since specific circuit design and manufacturing for a high speed and high voltage to output a single pulse and mode-lock are not needed, there are effects in that a cost for manufacturing a single pulse laser apparatus and power consumption can be reduced, and the single pulse laser can expand to Alexandrite laser and solid lasers having large non-linear coefficients and different gains based on polarization axes.

In addition, according to the present invention, there are effects in that, since a single pulse having a picosecond pulse width can be output, the single pulse laser apparatus can be applied to an industrial apparatus which needs high peak power, and can set a suitable pulse width of an output beam using an etalon based on a treatment purpose when applied as a medical laser.

Although the single pulse laser apparatus according to the present invention has been described according to the exemplary embodiment, the present invention is not limited thereto, and various modifications may be made within a range of the claims, the detailed description, and the accompanying drawings, and may fall within the scope of the present invention.

[Reference Numerals]

| | |
|---|---|
| 100: CAVITY | 110: FIRST MIRROR |
| 120: ELECTRO-OPTIC MODULATOR | |
| 130: LINEAR POLARIZER | 140: IRIS |
| 150: GAIN MEDIUM | 160: ETALON |
| 170: SECOND MIRROR | |

What is claimed is:
1. A single pulse laser apparatus comprising:
a first mirror and a second mirror disposed at both ends of the single pulse laser apparatus and having reflectivities of a predetermined level or more;
a gain medium rotated at a predetermined angle and configured to oscillate a laser beam in a manual mode-locking state;

a linear polarizer configured to output a beam having a specific polarized component of the oscillated laser beam;

an etalon configured to adjust a pulse width of the oscillated laser beam; and an electro-optic modulator configured to perform Q-switching and single pulse switching.

2. The single pulse laser apparatus of claim 1, wherein the gain medium is rotated at the predetermined angle to oscillate a diagonally polarized beam.

3. The single pulse laser apparatus of claim 2, wherein the linear polarizer outputs a beam having a vertically polarized component of the diagonally polarized beam, and a beam having a horizontally polarized component passes through the linear polarizer.

4. The single pulse laser apparatus of claim 3, wherein:

refractive indexes of the beams having the vertically polarized component and the horizontally polarized component change according to intensities of the beams; and a diagonally polarized component of the diagonally polarized beam is rotated into horizontal polarization due to a phase difference according to a difference in reflectivity.

5. The single pulse laser apparatus of claim 1, wherein a high gain axis of the gain medium is rotated at 30° with respect to the ground surface.

6. The single pulse laser apparatus of claim 1, wherein:

the etalon has parallel flat panels having a predetermined reflectivity, and is an optical element in which a multilayer dielectric thin film is deposited on the parallel flat panels formed of glass or crystal, or multilayer dielectric thin films are deposited on both surfaces thereof to increase reflectivity; and a pulse width of a laser beam is adjusted due to the reflectivity, a thickness, and a refractive index of the etalon in that a transmission wavelength band is limited when the laser beam passes through the etalon.

7. The single pulse laser apparatus of claim 1, wherein:

the etalon includes at least one etalon; and the etalons having different properties are selectively used inside or outside a cavity to adjust the pulse width of the laser beam.

8. The single pulse laser apparatus of claim 1, wherein a pulse width of the laser beam is adjusted to be within a range of 100 ps to 1 ns.

* * * * *